United States Patent [19]

Lord, Jr.

[11] Patent Number: 4,810,866
[45] Date of Patent: Mar. 7, 1989

[54] CHECK VALIDATION/CHECK WRITING SYSTEM

[76] Inventor: Miles Lord, Jr., 300 Ridgewood Ave., Minneapolis, Minn. 55403

[21] Appl. No.: 82,504

[22] Filed: Aug. 7, 1987

[51] Int. Cl.⁴ .............................................. G06F 15/30
[52] U.S. Cl. .................................... 235/379; 235/432; 235/441; 235/489
[58] Field of Search ................ 235/379, 489, 441, 432

[56] References Cited

U.S. PATENT DOCUMENTS

| | | |
|---|---|---|
| 2,616,623 | 11/1952 | Goodbar et al. . |
| 3,181,784 | 5/1965 | Becker . |
| 3,186,636 | 6/1965 | Hoffman et al. . |
| 3,441,714 | 5/1969 | Simjian . |
| 3,487,905 | 1/1970 | James, Sr. . |
| 3,624,357 | 11/1971 | Wright ............................... 235/489 |
| 3,648,241 | 3/1972 | Naito et al. . |
| 3,651,310 | 3/1972 | Link . |
| 3,824,544 | 7/1974 | Simjian . |
| 3,845,470 | 10/1974 | Schuller . |
| 3,941,977 | 3/1976 | Voss et al. . |
| 3,990,540 | 11/1976 | Aleshire et al. . |
| 4,028,537 | 6/1977 | Snow . |
| 4,053,735 | 10/1977 | Foudos ............................... 235/379 |
| 4,068,213 | 1/1978 | Nakamura et al. . |
| 4,114,027 | 9/1978 | Slater et al. . |
| 4,247,759 | 1/1981 | Yuris et al. . |
| 4,258,252 | 3/1981 | Simjian . |
| 4,276,598 | 6/1981 | Inoue et al. . |
| 4,321,672 | 3/1982 | Braun et al. . |
| 4,341,951 | 7/1982 | Benton . |
| 4,359,631 | 11/1982 | Lockwood et al. . |
| 4,373,133 | 2/1983 | Clyne et al. . |
| 4,375,032 | 2/1983 | Uchida . |
| 4,386,265 | 5/1983 | Sugimori . |
| 4,405,856 | 9/1983 | Poisson . |
| 4,424,567 | 1/1984 | Yasutake . |
| 4,469,937 | 9/1984 | Stockburger et al. . |
| 4,472,626 | 9/1984 | Frid . |
| 4,529,871 | 7/1985 | Davidson . |
| 4,587,409 | 5/1986 | Nishimura et al. . |

Primary Examiner—Harold I. Pitts
Attorney, Agent, or Firm—Orrin M. Haugen; Thomas J. Nikolai; Frederick W. Niebuhr

[57] ABSTRACT

Apparatus for accommodating a purchaser at a vendor's check-out station or the like with the check writer being provided with a communication line for validating and clearing checks, along with a register for determining the transaction total. The apparatus and system of the present invention further permits the purchaser/customer to insert a check blank from a personal checking account into the writer, and means are provided for printing appropriate indicia on the check blank, including date, payee, and amount of the check, and further having an opening for enabling the person to execute the already-imprinted check.

1 Claim, 1 Drawing Sheet

CHECK VALIDATION/CHECK WRITING SYSTEM

BACKGROUND OF THE INVENTION

The present invention relates generally to a check writer for use by purchasers at a vendor's check-out station, and wherein the check writer is a component in an overall system which includes a check writer, a communication line for validating and clearing checks, along with a register for determining the transaction total. The system of the present invention is particularly adapted for use in retail check-out stations, particularly of the type found at grocery markets and retail establishments. The check writer system permits the purchaser/customer to insert a check blank from a personal checking account into the writer, wherein means are provided for imprinting indicia upon the blank, and further means are provided for enabling the purchaser/customer to execute the imprinted check for completing payment of the transaction.

In retail establishments, purchasers/customers normally wait in line at a check-out station for the purpose of paying for the items to be purchased from the establishment. One frequent cause of delay in such check-out operations is that of time involved in the purchaser/customer writing a personal check for the items purchased. The time required in this phase of the check-out operation may be substantially reduced if the check writing operations may be undertaken on a more rapid basis, particularly one wherein the check writing operation is at least semi-automated.

In addition to the check writing operation, vendors or others who receive payment for goods and/or services are frequently troubled with return checks, such as checks returned because of a closed-account or for non-sufficient funds to cover the check as written. In accordance with one aspect of the present invention, a communication line is coupled as a component in the overall system and may verify and/or validate the check, as well as provide a means for determining the sufficiency of funds to cover the check as presented, at least at that point in time.

In its overall arrangement, the system of the present invention includes the check writer for imprinting indicia upon a check blank, such as date, payee, and the predetermined amount to be payable thereon, along with means for reading signal responsive indicia printed upon the check blank for indicating the banking institution as well as the customer's account number. A communication means is provided to transmit the identifying information contained on the check blank to the appropriate banking institution for the purpose of determining the existence of the indicated account, as well as the presence of funds sufficient to cover the total involved in the transaction. In order to determine the transaction total, register means are provided for transmitting this information to the communication means, and ultimately to the check writer. In this arrangement, therefore, the purchaser/customer need only insert a single check blank in the check writer such as in a receiving slot or the like, with the information reading means thereafter delivering signals to the communication means for determining the existence of the indicated account at the appropriate banking institution. Once the transaction total has been ascertained, this information is then transmitted through the communication means for determining the presence of sufficient funds to cover the check or draft, whereupon the check writer imprints the appropriate indicia upon the check blank. Following printing, the check blank is presented to the purchaser/customer through a window means, at which time the purchaser/customer executes the check for completing the transaction.

The information imprinted upon the check blank by the check writer includes the date, payee, and amount to be payable in both numerical and written form. The purchaser/customer, as maker of the check, need only inspect the printed document for accuracy, and execute the document by placing his signature thereon.

At the present time, check blanks utilized by banking institutions in this country and used by private individuals are of a standard size and form. These blanks include coded information thereon, with the information including an identification of the banking institution, its location, as well as customer account number and check blank identification number. this coded information is provided on the surface of the printed check with magnetic ink, and reading devices are commonly available to read the information contained on the check blank, and transmit that information as a signal indicative of these items.

SUMMARY OF THE INVENTION

Therefore, in accordance with the present invention, a check writer for use by purchasers/customers at a vendor's check-out station is provided in combination with a communication means and a transaction totalizing register for the purpose of imprinting the appropriate indicia upon the check blank, and presenting the printed check blank to the purchaser for signature and execution.

It is a further object of the present invention to provide an improved check writing system for use by purchasers at a vendor's check-out station wherein the check writer includes means for reading information coded thereon by the banking institution so as to validate and clear a check written in the amount representing the total of the purchasing transaction.

Other and further objects of the present invention will become apparent to those skilled in the art upon a study of the following specification, appended claims and accompanying drawings.

IN THE DRAWINGS

FIG. 1 is a schematic illustration of the system of the present invention, including the check writer, the communication means for validating and clearing a check, as well as a register for providing the total due in the transaction, the check writer including means for imprinting indicia upon a check blank and for presenting the check to the purchaser/customer for signature and execution; and FIG. 2 is a perspective view, partially cut-away, illustrating the interior features of the check writer component of the system of the present invention.

DETAILED DESCRIPTION OF THE PREFERRED EMBODIMENT

Figure 1:
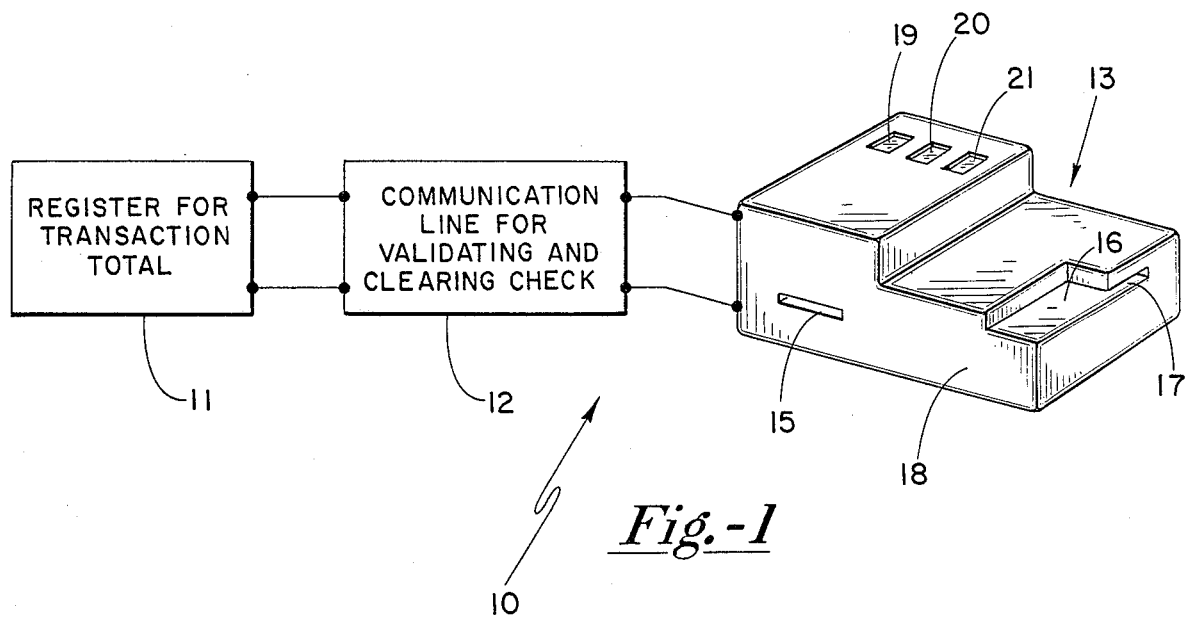

In accordance with the preferred embodiment of the present invention, and with particular attention being directed to the drawing, the system generally designated 10 includes a series of components and/or subsystems, such as a register 11 for providing the transaction total, a communication means 12 for establishing communication between the system and a banking information center for the purpose of validating and clearing a check, along with the check writer generally designated 13. The check writer 13 is in communication with both the transaction totaling register 11, and the communication means 12, with the check writer having a code-reading means as well as a indicia imprinting means contained therein.

The register for establishing the total of the transaction is of a type which is generally characterized as a cash register. The register contains output means for generating a signal representative of the total amount of money involved in the transaction. Such registers are, of course, commercially available and widely used in the retail industry.

The communication means 12 is coupled to the register 11, as well as to the check writer 13, with the communication means 12 including a communication line such as a phone line for validating and clearing the check to be written by writer 13. The communication line is of the type coupled to a data bank wherein information is contained relative to the existence of the checking account indicated on the check blank, as well as, in certain instances, the balance available in the account at the time of inquiry.

With attention now being directed to check writer system 13, the structure includes a housing body, as indicated, with means being provided therein for inserting a coded check blank as at 15 into the apparatus. Contained within the housing are means for imprinting indicia on the blank inserted therein, such as date, payee, and a predetermined amount in both numerical and written form. Such printers are, of course, commercially available. At the output end of the check writer 13, and as at 16, a window area or zone is provided for displaying the preprinted check to the purchaser/customer, and with the window area 16 being disposed immediately above that certain portion of the printed check designed for signature. A delivery port 17 is provided for delivering the printed check therefrom following signature and execution by the purchaser/customer.

Within the confines of the housing for check writer 13 are signal responsive means for reading banking institution information which is coded on the check blank. Such signal responsive and/or reading means are, of course, commercially available. Upon printing of checks for private customers, the banking institutions utilize a series of numerical indicia imprinted with ink containing magnetic media, thereby providing a signal means which can be appropriately read.

In order to provide assistance to the vendor's check-out personnel, a series of windows or light-indicators are provided as at 19, 20 and 21. Specifically, these light indicia are designed to indicate the occurrence of certain events, such as the establishment of a communication link to the data bank for obtaining data from the banking institution, such as 19, the processing of such data within the system, such as indicated by indicator lamp 20, and the completion of the validating and clearing operation as indicated by indicator lamp 21. Further indicators may be provided, if desired, to indicate a failure of the system to validate and/or clear the check.

In communication means 12, means may be provided for establishing the present credit balance in the purchaser/customer account at the banking institution. By suitable utilization of a comparator, it can be determined if the amount of the purchase (the amount represented on the check to be written) is sufficient to cover the check at the time. Such comparator systems are, of course, commercially available.

Figure 2:
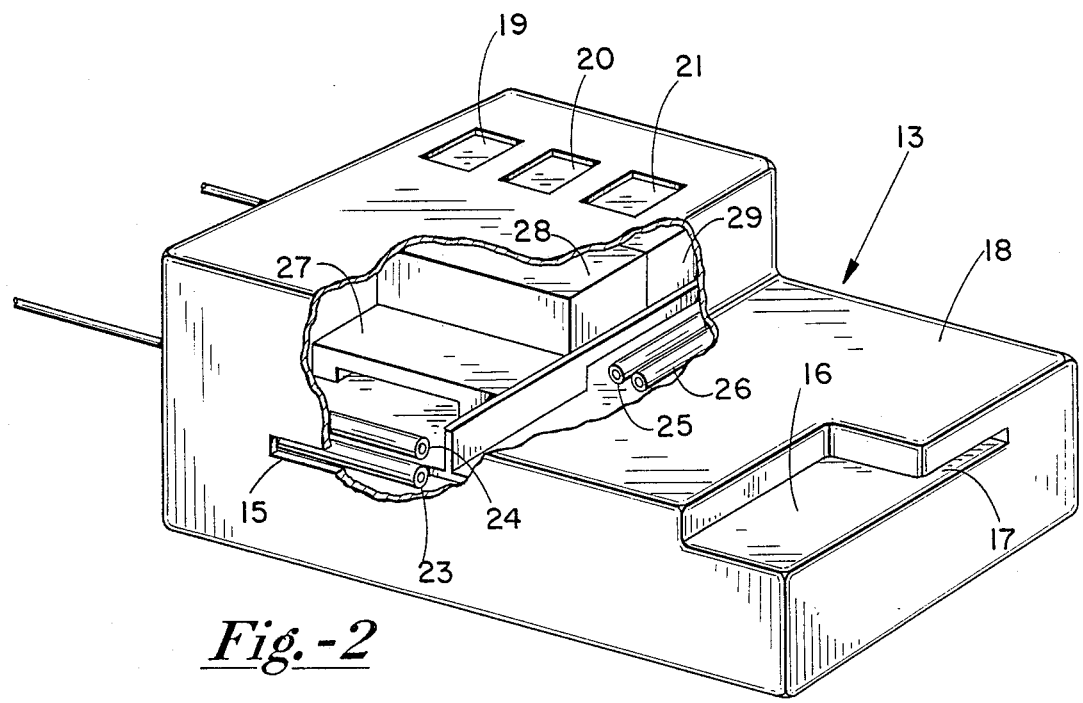

Attention is now directed to FIG. 2 of the drawings wherein a partially cut-away view of the check writer device is illustrated. As illustrated in FIG. 2, therefore, draw rolls 23 and 24 are utilized to bring the check blank into the system for subsequent operation. These draw rolls (or pinch rolls) bring the check blank to a location where its coded information may be read. Thereafter, the check blank is transmitted by operation of draw rolls 25 and 26 which are designed to move the check blank to a location where window area or zone 16 permits the writer to sign the check as maker.

In the initial operation of the system, the check blank entering the device may have the coded information read by the validation reader system 27, with such validation readers being, of course, commercially available. The imprinting of the check blank, including the date and identification of the payee may be undertaken in the system as at 28. Furthermore, printer 28 may imprint the total amount of the purchases on the face of the check, at the appropriate location, after receiving the information from communication lines and register.

As further indicated in the cut-away view of FIG. 2, enclosure 29 is employed to control the operation of light indicators as at 19, 20 and 21. As indicated hereinabove, these light indicia are designed to indicate the occurrence and undertaking of certain events within the overall mechanism. Such control means are, of course, known in the art and commercially available.

By way of actual operation, therefore, the purchaser/customer approaches the check-out station and while vendor or store personnel are totaling the transaction, the purchaser/customer may insert a check blank into insertion port 15. When the check blank is received within the system, signal responsive means are energized to read banking institution information coded on the check blank for transmission to the appropriate data bank. By this operation, verification of the existence of the indicated account may be obtained. Upon receiving the transaction total as a signal from the register, a comparator may be utilized to ascertain that the current balance available in the account of the purchaser/customer is adequate to cover the check being written. At this point, the writer is energized so as to imprint the date. The identity of the payee, as well as the total amount of purchases as represented by the register transaction total. The check is then advanced from the receiving station to the viewing station and the customer may affix his signature to the check at the appropriate location, and the check may then be passed outwardly from the equipment as at slot 17. Accordingly, the sequence of operations may be simply stated as follows:

(1) insert check;
(2) validate check;
(3) determine total amount of purchase;
(4) clear total of check to be written with validator to determine sufficiency;
(5) imprint date;
(6) imprint payee;
(7) imprint total amount of purchases on face of check;
(8) purchaser/customer executes check;
(9) eject completed check.

Accordingly, the system of the present invention provides, in combination, a check writer together with a communication system for validating and clearing the check, along with a register for providing a transaction total. Time and accuracy of commercial transactions are achieved through the utilization of this system.

What is claimed is:

1. In combination with a check writer for use by purchasers at a vendor's check-out station, wherein the check writer includes means for imprinting indicia upon a check blank with the indicia including date, payee, and a predetermined amount to be payable thereon, the predetermined amount being indicated in both numerical and written form, a communication means for validating a coded check blank for said predetermined amount from the maker thereof, and means for determining the total amount due the vendor from the purchaser, said combination being particularly characterized in that:

(a) said check writer comprises a housing body with means for inserting a coded check blank therein, with the coded information including banking institution information including the purchaser's account number, means for imprinting indicia on said check blank including date, payee, and a predetermined amount to be payable thereon, and signal responsive means within said housing body for reading said banking institution information coded on said check blank;

(b) communication means having signal transmission means therein for reading said coded banking information from a check blank inserted therein and for communicating with a banking institution for verifying a credit balance present in the purchaser's account at the banking institution, and being operatively coupled to said check writer;

(c) register means coupled to said check writer and said communication means for determining the total amount due the vendor from the purchaser and for transmitting said total amount to said check writer indicia imprinting means for imprinting said total amount upon a check blank within said check writer;

(d) window means on the surface of the housing body of said check writer for presenting portion of said imprinted check blank to the purchaser and for retaining said check blank while permitting the purchaser to execute said imprinting check blank; and (e) discharge means within the housing body of said check writer for delivering the printed executed check blank therefrom.

* * * * *

UNITED STATES PATENT AND TRADEMARK OFFICE
CERTIFICATE OF CORRECTION

PATENT NO. : 4,810,866
DATED : March 7, 1989
INVENTOR(S) : Miles Lord, Jr.

It is certified that error appears in the above-identified patent and that said Letters Patent is hereby corrected as shown below:

Column 6, line 18, "portion" should read -- portions --.
Line 21, "imprinting" should read -- imprinted --.

Signed and Sealed this

Fifteenth Day of August, 1989

Attest:

DONALD J. QUIGG

Attesting Officer

Commissioner of Patents and Trademarks